United States Patent [19]
Sherman

[11] Patent Number: 5,533,549
[45] Date of Patent: Jul. 9, 1996

[54] BALL VALVE WITH INTEGRATED REMOVABLE FLOW VENTURI, FLOW BALANCING MEANS, AND PIPE UNION MEANS

[75] Inventor: John C. Sherman, Highland, Mich.

[73] Assignee: Hydronic Components, Inc., Madison Heights, Mich.

[21] Appl. No.: 378,776

[22] Filed: Jan. 26, 1995

[51] Int. Cl.$^6$ .................................................. G01F 1/44
[52] U.S. Cl. .................. 137/557; 137/556.6; 251/118; 251/315.14; 73/861.63
[58] Field of Search ............... 251/315.14, 118, 251/288; 137/556, 556.3, 556.6, 551, 557; 73/861.63

[56] References Cited

U.S. PATENT DOCUMENTS

| | | | |
|---|---|---|---|
| 2,323,839 | 7/1943 | Nixon | 251/118 |
| 2,337,921 | 12/1943 | Petroe | 251/118 |
| 2,344,219 | 3/1944 | Smith | 251/118 |
| 3,617,027 | 11/1971 | Scaramucci | 251/315.14 |
| 3,896,670 | 7/1975 | Converse, III et al. | 73/861.63 |
| 4,312,342 | 1/1982 | Chittenden | 73/861.63 |
| 4,874,007 | 10/1989 | Taylor | 251/118 |
| 4,964,614 | 10/1990 | Sands et al. | 251/315.14 |
| 5,025,833 | 6/1991 | Hendrick | 137/625.31 |
| 5,271,427 | 12/1993 | Berchem | 137/375 |

*Primary Examiner*—A. Michael Chambers
*Attorney, Agent, or Firm*—Robert G. Mentag

[57] ABSTRACT

A valve assembly for use in heating, ventilating and air conditioning systems. The valve assembly includes a valve body having a chamber in which is rotatably mounted a quarter-turn flow control ball valve. A valve body nut having an outlet port is threadably mounted on the valve body adjacent the outlet end of the valve body chamber. A flow venturi is removably mounted in the inlet end of the valve body. A pipe union tailpiece is detachably mounted on the inlet end of the valve body. A pair of pressure/temperature readout ports are mounted on the valve body for use in determining the rate of fluid flow through the venturi. A vent plug is mounted on the valve body for venting air from the ball valve chamber.

4 Claims, 3 Drawing Sheets

BALL VALVE WITH INTEGRATED REMOVABLE FLOW VENTURI, FLOW BALANCING MEANS, AND PIPE UNION MEANS

BACKGROUND OF THE INVENTION

1. Field of the Invention

The field of art to which this invention pertains may be generally located in the class of devices relating to valves. Class 137, Fluid Handling, United States Patent Office Classification, appears to be the applicable general area of art to which the subject matter similar to this invention has been classified in the past.

2. Description of the Prior Art

This invention relates to a flow control ball valve with an integrated removable venturi, a flow balancing means, and a pipe union means for use in a heating, ventilating and air conditioning system. The integrated structure of the present invention combines the most sought after components used in piping fan coils and air handling units into a single compact, easy to install product. Heating and cooling systems have widely varying flow rates requiring different sized venturis to properly measure the flow through the systems. Whenever a heating, ventilating and air conditioning chilled water or hot water system is installed in a facility, it employs terminal units such as fan coils, heat pumps, air handlers or ventilating air coils to heat or cool the individual spaces within the facility. To allow each coil to be insulated, serviced, checked and balanced, a number of components are used. These components include isolation valves, balance valves, unions and pressure/temperature readout ports. Components can, and are, used in virtually any combination. A typical job will use a number of each of these components around every coil to satisfy the requirements as stated on the plans for a system. Unfortunately, these component combinations can become very complex. A typical two-way coil piping schematic for a large facility, for example, can contain over eight components and fifteen pipe fittings which require over 26 piping connections to complete. At ten minutes per piping connection, this works out to over four hours to pipe up one coil. Multiply this by the fifty or so coils on a normal job, and a labor requirement quickly runs up into the hundreds of hours, and thousands of dollars of labor costs.

SUMMARY OF THE INVENTION

It is a primary object of the present invention to provide a ball valve which has integrated therewith a removable flow venturi, a flow balancing means, a pipe union means, and an air vent tapping plug, whereby the air collected in the body cavity of the valve can be removed easily if the valve is employed in a fluid stream such as a water stream.

It is another object of the present invention, to provide a ball valve provided with a valve position indicator plate and an adjustable memory position indicator stop member, and with an integrated removable flow venturi and two associated pressure temperature readout ports, whereby it is possible to satisfy the requirements of a heating, ventilating and air conditioning system with a minimum of valve bodies, at reduced installation labor costs and provide a capability to customize each system by using various combinations of venturis to effect a prebalancing of such a system.

The flow venturi allows flow measurements to be taken through the two pressure/temperature readout ports as fluid travels through the valve, with the ball valve in an open position. Once the flow measurement through the venturi is determined the ball valve can be throttled, that is partially closed. Successive pressure/temperature readings are then taken and the ball valve is further throttled until the desired flow through the ball valve is obtained. At that point the adjustable memory position indicator stop member is set permit the ball valve to be closed and then be reopened to the position of desired flow. The adjusted position of the memory position indicator stop member relative to the valve position the memory stop indicator plate is recorded for record purposes.

Each one of the functions described hereinabove is typically performed by a separate device in heating, ventilating, and air conditioning systems. Each one of the functions requires at least two piping connections, and every heat transfer coil installed to heat and cool a given space within a building requires all these devices to perform its function correctly. By combining all of these separate devices into a single valve, considerable time is saved in the installation of a heat transfer coil. In addition, approximately ten piping connections are eliminated, thus removing ten potential leak points. Also, the integrated ball valve of the present invention is one fifth the installed length of the components it replaces, making the installation of a heat transfer coil much easier in what is typically a very cramped installation space.

DESCRIPTION OF THE PREFERRED EMBODIMENT

Figure 1:
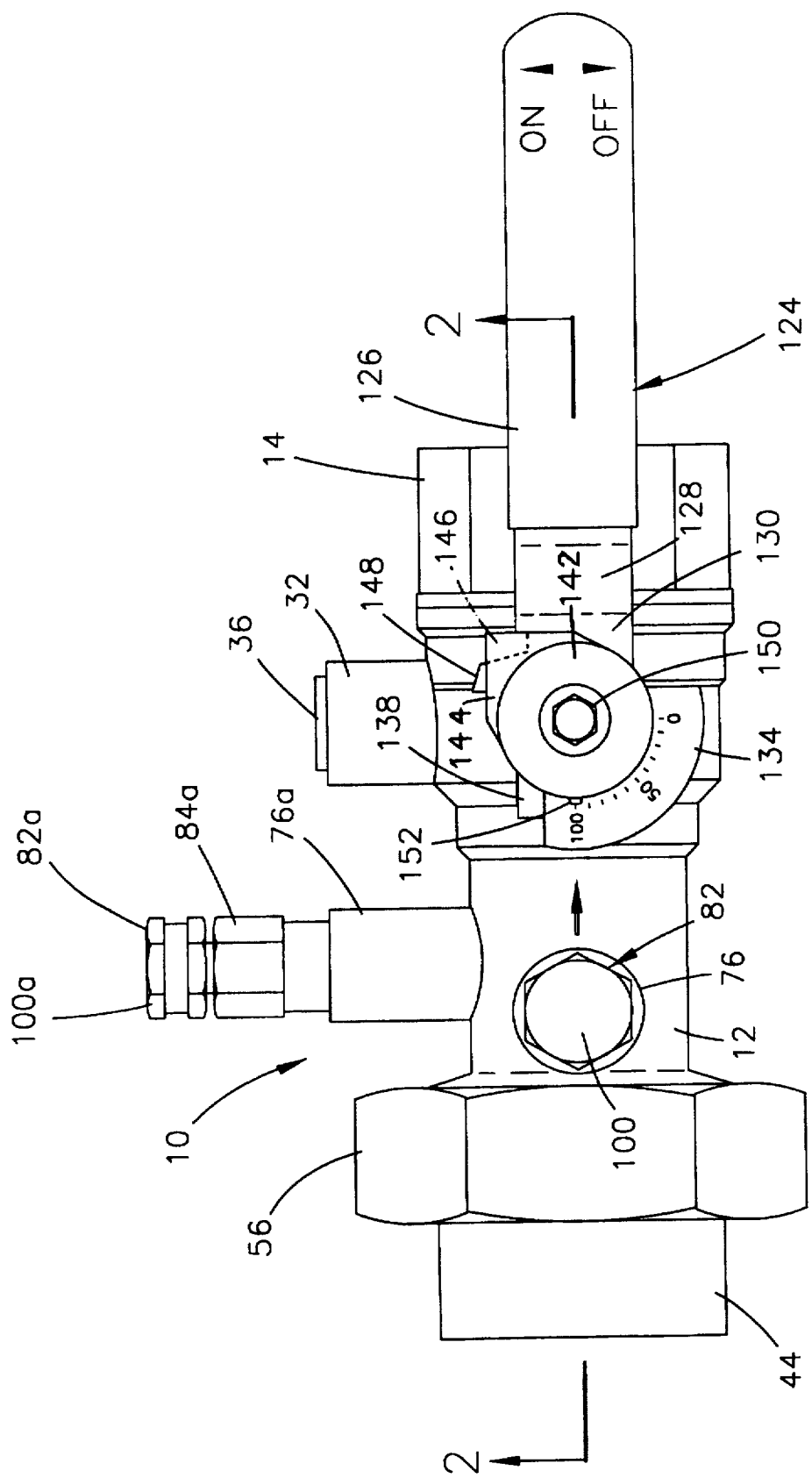
FIG. 1 is a top plan view of a ball valve with an integrated removable venturi, a flow balancing means, a pipe union means, and an air vent means, made in accordance with the principles of the present invention.
Figure 2:
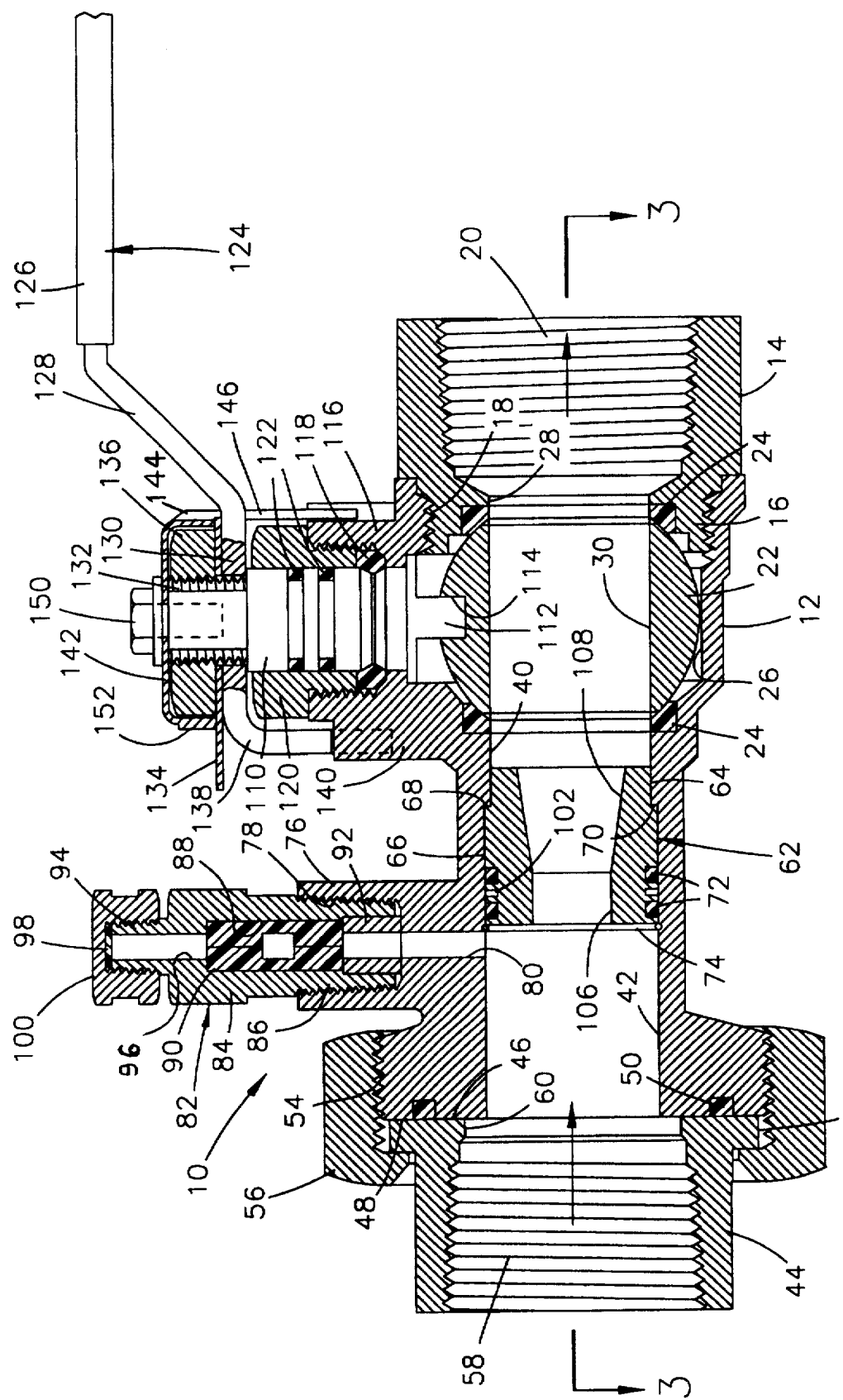
FIG. 2 is a vertical section view of the ball valve illustrated in FIG. 1, taken along the line 2—2 thereof, and looking in the direction of the arrows.

Referring now to the drawings, and in particular to FIGS. 1 and 2, the numeral 10 generally designates a ball valve assembly including a integrated removable venturi, a flow balancing means, and a pipe union means. The integrated ball valve assembly 10 comprises a valve body 12 that is provided on the exit end thereof with a valve body nut 14. The inner end of the valve body nut 14 is circular in shape and is provided with a peripheral threaded portion 16. The peripheral threaded inner end 16 of the valve body nut 14 is threadably mounted in the internally threaded valve body outlet end 18 of the valve body 12. The valve body nut 14 is provided with a threaded outlet port 20. A flow control quarter-turn ball valve 22 is rotatably mounted in a ball valve chamber 26 in the valve body 12 on a pair of ball seals 24. The flow control quarter-turn ball valve 22 is rotatably mounted about an axis perpendicular to the longitudinal axis of the valve body 12. The valve body nut 14 is provided with an inlet opening 28 on the inner end thereof, which communicates with a passage 30 formed through the flow control ball valve 22.

Figure 3:
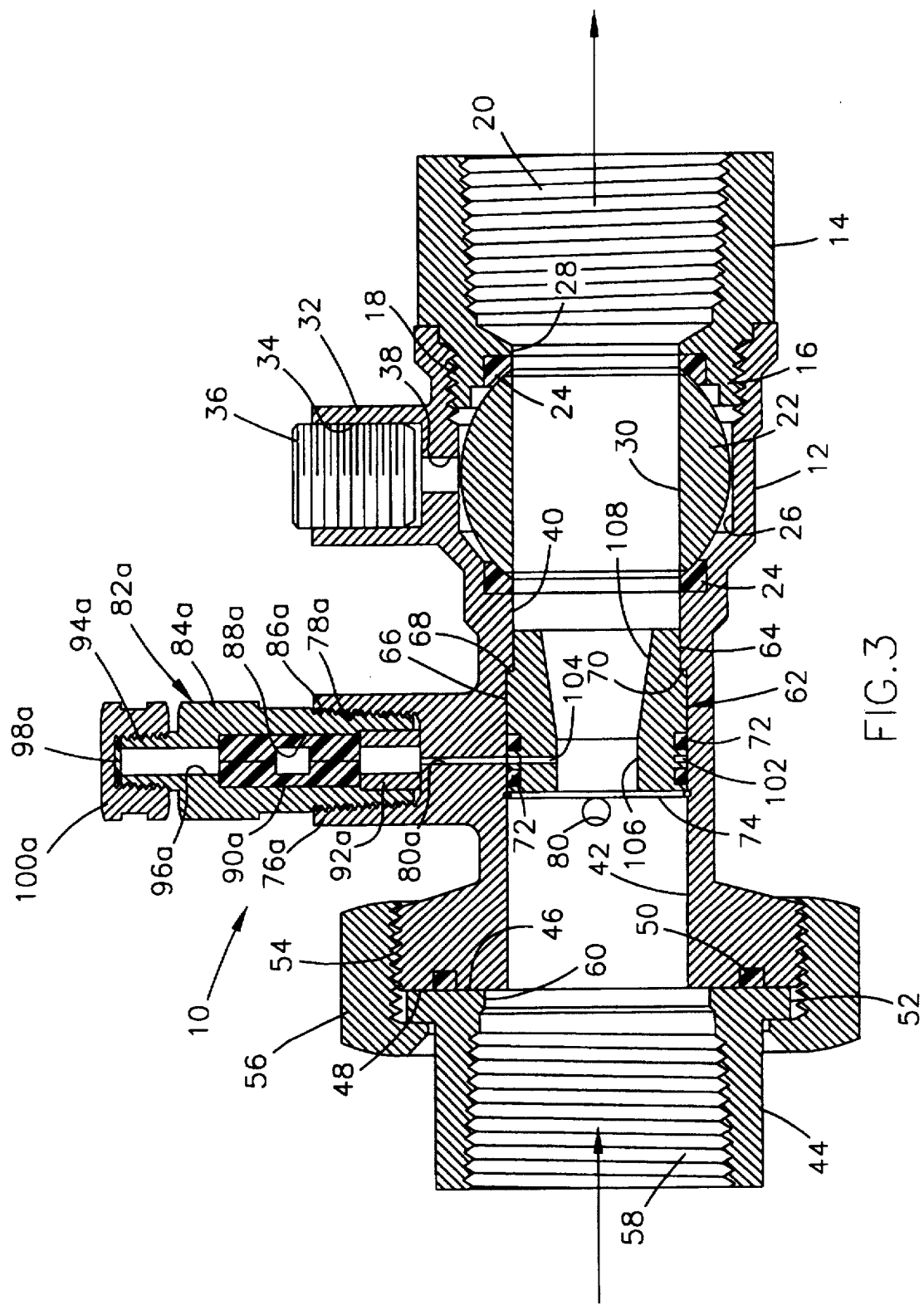
FIG. 3 is a horizontal section view of the ball valve structure illustrated in FIG. 2, taken along the line 3—3 thereof, and looking in the direction of the arrows.

As shown in FIG. 3, the valve body 12 is provided with a transverse, outwardly extended integral hub 32 which is positioned centrally relative to the ball valve chamber 26. The hub 32 is provided with an internal threaded plug bore 34 in which is threadably mounted an air vent tapping plug 36. The inner end of the vent plug bore 34 communicates with the ball valve chamber 26 by a transverse vent passage 38. The last described vent passage 38 and vent plug bore 34, provide an air removal passage. When the valve ball 22 is in a partially open position, the valve ball chamber 26 or cavity, between the ball valve 22 and the valve body 12 is open to fluid flow through the ball valve 22. Air traveling in a water stream through the ball valve 22 will seek the point of low velocity, which is the valve body chamber 26. The air collected in the valve body chamber 26 may be removed easily by loosening the air vent tapping plug 36.

The valve body 12 is provided with a stepped diameter, cylindrical inlet passage which is aligned with the passage 30 formed through the ball valve 22. The outer end of said stepped diameter, cylindrical inlet passage is indicated by the numeral 42 and it is formed to a diameter larger than the exit end thereof, which is indicated by the numeral 40 and which is aligned with and communicates with the passage 30 formed through the ball valve 22. A union tailpiece 44 is detachably mounted on the inlet end of the valve body 12. The inner end face 46 of the union tailpiece 44 seats against the face 48 of the inlet end of the valve body 12. An O-ring seal 50 is operatively mounted in the face 48 of the inlet end of the valve body 12, and it seats against the inner end face 46 of the union tailpiece 44. The union tailpiece 44 is provided with a peripheral thread 52 on the inner end thereof around which is threadably mounted the internal threaded portion 54 of a union nut 56, for securing the union tailpiece 44 to the valve body 12. The union tailpiece 44 is provided with an inlet port 58 which communicates through an opening 60 in the inner end thereof with the inlet end of the stepped diameter, cylindrical inlet passage bore 42.

A venturi, generally indicated by the numeral 62 is slidably and removably mounted in the stepped diameter, cylindrical inlet passage 40,42. The inner end of the venturi 62 is formed with a circular periphery 64 which is of a smaller diameter than the diameter of the venturi outer end 66. An annular shoulder 68 is formed around the periphery of the venturi 62 at the junction point between the venturi outer peripheries 64,66. The venturi annular shoulder 68 is seated against a mating shoulder 70 formed at the junction point between the peripheries of the stepped cylindrical passage inlet portions 40,42. The venturi 62 is releasably retained in the valve body 12 by a removable retainer clip 74. The venturi 62 is provided around the periphery thereof, adjacent the entrance end thereof, with a pair of longitudinally spaced apart O-ring seals 72.

As shown in FIG. 1, an integral, cylindrical hub 76 is formed on the valve body 12, in a position adjacent the inlet end of the venturi 62, and on a transverse axis which is perpendicular to the axis of the air vent hub 32. As shown in FIG. 2, the integral hub 76 is provided with a threaded bore 78 which extends inwardly from the outer end thereof and which communicates at its inner end with a transverse cylindrical passage 80 that is connected to the bore 42 of the stepped diameter, cylindrical inlet passage in the valve body 12. The transverse cylindrical passage 80 is positioned to communicate with the last mentioned passage bore 42 in a position adjacent to the inlet end of the venturi 62.

Mounted in the threaded bore 78 of the integral hub 76 is a conventional pressure/temperature readout port, which is identified generally by the numeral 82. The conventional pressure/temperature readout port 82 is available from Sisco, Inc. of 1700-B Industrial Highway, Cinnaminson, N.J., 08077-2547, under Model Number BNO-250. The pressure/temperature readout port 82 includes an elongated body 84 which has a threaded lower end 86 that is threadably seated in the threaded bore 78 in the integral hub 76. An enlarged, longitudinally extended bore or chamber 88 is formed in the pressure/temperature readout port body 84 and it is open on the lower end and communicates through a transverse cylindrical passage 80 with the inlet bore 42 in the valve body 12. An elastomeric member 90, which is cylindrical in shape, is operatively mounted in the bore 88, and its upper end is seated against the shoulder in the readout body 84 formed by the upper end of the bore 88. The lower end of the elastomeric cylindrical member 90 is seated on a metal retainer tube 92 that is operatively seated in the lower end of the readout port bore 88 and is retained in position by any suitable means, as by a pressfit. The metal retainer tube 92 communicates at its lower end with the transverse cylindrical passage 80 in the valve body 12. The body 84 of the pressure/temperature readout port 82 is provided on the upper end thereof with an integral reduced diameter extension 94, through which is formed an axial, cylindrical passage 96 that communicates with the upper end of the enlarged bore or chamber 88 in the readout port body 84. The outer or upper end of the cylindrical passage 96, in the upper end 94 of the readout body 84 of the readout port body 84, is enclosed by a seal 98 and a cap 100 threadably mounted on the threaded upper end 94 of the readout body 84 when the readout port 82 is inactive.

As shown in FIG. 1, a second pressure/temperature readout port is mounted on the valve body 12, on a transverse axis which is disposed 90 degrees to the transverse axis of the first readout port 82, and it is indicated by the numeral 82a. As shown in FIG. 3, the second pressure/temperature readout port 82a is mounted in a position for communication with a passage 80a which communicates with the bore 42 of the stepped passage through the valve body 12, and in a position which is perpendicular to the throat of the venturi 62. As shown in FIG. 3, the parts of the second pressure/temperature readout port 82a, which are the same as the parts of the first pressure/temperature port 82, are marked with the same reference numerals followed by the small letter "a". The two pressure/temperature readout ports 82 and 82a are identical in structure and use.

As shown in FIG. 3, the passage 80a that communicates with the second pressure/temperature readout port 82, communicates at its inner end with an annular or peripheral groove 102 that is formed around the periphery of the throat of the venturi 62. The annular or peripheral groove 102 formed around the venturi 62 communicates at its inner end with a transverse cylindrical bore 104 that communicates with the entrance or throat passage 106 of the venturi 62. As shown in FIG. 3, the venturi 62 is provided with a divergent exit passage 108 that communicates with the cylindrical passage 40 in the valve body 12.

As shown in FIG. 2, the ball valve 22 is provided with a valve stem or shaft 110 which has a lower integral rectangular end 112 that is seated in a rectangular slot 114 that is formed in the upper end of the ball valve 22. The valve stem or shaft 110 is rotatably mounted in a valve stem hub 116 that is integrally formed on the valve body 12. The valve stem hub 116 is internally threaded and seated in the inner end of the valve stem hub 116 is a conventional packing gland 118 which is held in an operative position in the valve stem hub 116 by a conventional packing gland nut 120. A pair of axially spaced apart O-ring seals 122 are mounted around the periphery of the valve stem or shaft 110 in sealing in engagement with the inner bore of the packing gland nut 120.

As shown in FIGS. 1 and 2, a control lever, generally indicated by the numeral 124, is provided for rotating the ball valve 22 between a closed and an open position. As shown in FIG. 2, the control lever 124 includes a handle portion 126 which is integrally connected to a downwardly angled portion 128 that is integral with a flat portion 130. The handle flat portion has an opening therethrough for seating it around the threaded integral upper end 132 of the valve stem or shaft 110. A control lever position indicator plate 134 has an opening therethrough to position it over the integral threaded upper end 132 of the valve stem or shaft 110. A control lever nut 136 is threadably mounted on the integral threaded upper end 132 of the valve stem or shaft 110 and releasably retains the flat portion 130 of the control lever 124 and the position indicator plate 134 in place. As shown in FIG. 2, the flat portion 130 of the control lever 124 is provided on a free end thereof, with an integral downwardly extended lip 138, which engages an integral stop protrusion 140 on the hub 116, when the control lever 124 is in the open position shown in FIGS. 1 and 2, and the ball valve 22 is in a full flow position.

As shown in FIG. 1, the ball valve 22 is provided with a memory position indicator circular cap member 142 which is provided with an outwardly integral extension 144 on one side thereof. An integral downwardly extended memory position stop leg 146 (FIG. 2) is integrally formed on the memory position cap extension 144. A vertical, integral stop 148 (FIG. 1) is formed on the valve body 12, and it extends upwardly therefrom, and is adapted to be engaged by the memory position stop leg 146, as described hereinafter. A retainer bolt 150 is mounted through an opening in the top wall of the memory position cap member 142, and it extends downwardly into a threaded hole in the upper end of the valve stem 132 for securing the memory position cap member 142 in a rotated position relative to the valve stem 110. As shown in FIG. 1, the memory position cap member 142 is provided with an integral protrusion 152 on the side thereof to show the position of the memory position cap 142 in an adjusted position relative to the percentage degree of valve opening on the position indicator plate 134.

In use, the ball valve, with the integrated removable flow venturi, with the flow balancing means is operatively mounted in a fluid flow line of a heating, ventilating and air conditioning system by means of the valve body nut 14 and the union tailpiece 44 and union nut 56. The flow ball valve flow control handle 124 for the ball valve 22 is shown in FIGS. 1 and 2 in an open valve position. The ball valve 22 may be turned to a fully closed position by rotating the control handle 124 through a 90 degree turn, in a clockwise direction, as view in FIG. 1.

Heating and cooling systems in large buildings have a plurality of circuits with widely varying flow rates, that require different size venturis to properly measure the flow through a fluid flow control valve. By providing a removable venturi it is possible to satisfy the requirements of the heating and cooling industry with a minimum of valve bodies. Furthermore, it is possible to customize each installation by using various sizes of flow venturis for the various flow valves incorporated in a heating and cooling system, and thus provide a means for prebalancing the flow of fluid through a plurality of valves in a heating and cooling system.

As shown in FIG. 1, when the ball valve control lever 124 is in the full flow or 100% flow position, the memory position stop leg 146 and the memory position indicator circular cap member 142 are releasably secured on the valve stem 110 in a position shown in FIG. 1, so that the stop leg 146 abuts the stop member 148. In this condition, the ball valve control lever 124 may be rotated 90 degrees between the open position shown in FIG. 1 and a closed position. However, in a heating and cooling system it is necessary to regulate the flow of fluid through the ball valve 22. For example, in a water flow line it may be desirable to provide a certain volume flow, as for example, four gallons of fluid per minute.

In order to set the control lever 124 for a desired flow, the caps 100 and 100a on the pressure/temperature readout ports 82 and 82a are removed. Conventional pressure and temperature needle type instruments are then used to determine the pressure drop across the throat of the venturi 82. The pressure and temperature needle type instruments are provided with the pressure/temperature readout ports 82 and 82a, by the manufacturer of the same, who is listed hereinbefore. A needle type pressure instrument is inserted downwardly through each of the passages 96 and 96a, in the readout ports 82 and 82a, respectively, and through the elastomeric members 90 and 90a, and into the bores 42 and the throat portion 106 of the venturi 62. Such instruments have pressure indicating instruments attached thereto as for example, manometers. Temperature difference readings of the fluid flowing through the venturi 62 are also obtained by temperature needle instruments inserted downwardly through the readout ports 82 and 82a. The pressure and temperature differences between the pressure and temperature readings obtained through the readout ports 82 and 82a are then compared to a flow calibration chart for the particular venturi 62 which is being used and the calibration chart for such a venturi 62 employed. If the calibration chart for the particular venturi indicates that a four inch pressure differential, and the temperature difference obtained, results in seven gallons of fluid per minute through the particular venturi 62, the user will throttle the ball valve control lever 124, that is move it in a clockwise direction as viewed in FIG. 1 to reduce the flow of fluid through the ball valve 22.

Successive pressure and temperature differential readings are taken together with successive throttling movements of the ball valve control lever 124 until the desired flow through the venturi is reached, as for example, the aforestated four gallons per minute. At that point, the retainer bolt 150 is loosened, and the memory position cap member 142 is rotated counter clockwise, as viewed in FIG. 1, to bring the memory position stop leg 146 into engagement with the integral vertical stop 148. The retainer bolt 150 is then secured in place, to lock the position of the memory position stop leg 146 in its adjusted position. The differential pressure and temperature which provides the desired volume of fluid flow through the venturi 62 is recorded, and the setting of the position indicator protrusion 152 on the memory position cap 142, relative to the percentage valve open position it is adjacent to on the position indicator plate 134 is also recorded. It will be seen, that after the aforedescribed balancing steps have been carried out, it is possible to move the ball valve control lever 124 clockwise, as viewed in FIG. 1, to a fully closed position, and it may thereafter be turned counterclockwise back to the desired and preset flow position, because the stop leg 146 will engage the stop 148 and prevent the control lever 124 from being moved further in a counterclockwise direction.

What is claimed is:

1. In a valve assembly, the combination comprising:

(a) an elongated valve body (12) having an inlet end and an elongated inlet bore (40,42);

(b) a flow venturi (62) removably mounted in said elongated inlet bore (40,42), and having an inlet end with an entrance throat passage (106) and an outlet end with an exit passage 108;

(c) a union tailpiece (44) detachably mounted on the inlet end of the valve body (12), by a union nut (56), and having an inlet port (58) formed therein;

(d) said elongated valve body (12) having a ball valve chamber (26) formed therein, adjacent the venturi exit passage (108);

(e) a quarter-turn ball valve (22) rotatably mounted in said ball valve chamber (26) for controlling the flow of fluid through the valve body (12);

(f) a valve body nut (14) detachably mounted on the valve body (12), adjacent the ball valve chamber (26), and having an outlet port (20) formed therein;

(g) a first pressure/temperature readout port (82) detachably mounted on said valve body (12);

(h) a first readout passage (80) formed in the valve body (12) and communicating said first pressure/ temperature readout port (82) with said elongated inlet bore (42) adjacent the inlet end of the venturi (62);

(i) a second pressure/temperature readout port (82a) detachably mounted on said valve body (12);

(j) a second readout passage (80a) formed in the valve body (12) and communicating said second pressure/ temperature readout port (82a) with passage means (102,104) in the venturi (62) which communicate with the venturi entrance throat passage (106);

(k) control lever means (124) attached to said ball valve (22) for rotating the ball valve (22) between open and closed positions; and, (l) said pressure/temperature readout ports (82,82a) being adapted to allow pressure and temperature detecting instruments to be inserted throughout to provide the pressure and temperature differences of fluid flowing into the venturi (62) and the fluid flowing through the entrance throat passage (106) of the venturi (62), for determining the rate of flow of fluid through the ball valve (22) for setting the ball valve (22) in a selected open position.

2. In a valve assembly, the combination as defined in claim 1, comprising:

(a) a memory position stop (148) integrally formed on the valve body (12); and, (b) control lever memory position means (142,144, 150) adjustably mounted on said valve stem (110) and including a stop leg (146) engagable with the memory position stop (148) to restrict rotary movement of the ball valve (22) to a selected open position.

3. In a valve assembly, the combination as defined in claim 2, comprising:

(a) a position indicator plate (134) carried by said control lever means (124); and, (b) a position indicator means (152) on said control lever memory position means (142,144,150) for indicating the adjusted open position of the control lever means (124) when the stop leg (146) engages the memory position stop (148).

4. In a valve assembly, the combination as defined in claim 3, comprising:

(a) a vent plug hub (32) formed on the valve body (12) and having a threaded vent plug bore (34) formed therein;

(b) a vent passage formed in the valve body (12) and communicating the valve body chamber (26) with the vent plug bore (34); and, (c) a removable vent plug (36) threadably mounted in said vent plug bore (34) for venting air from said valve body chamber (26).

* * * * *